United States Patent Office 3,594,298
Patented July 20, 1971

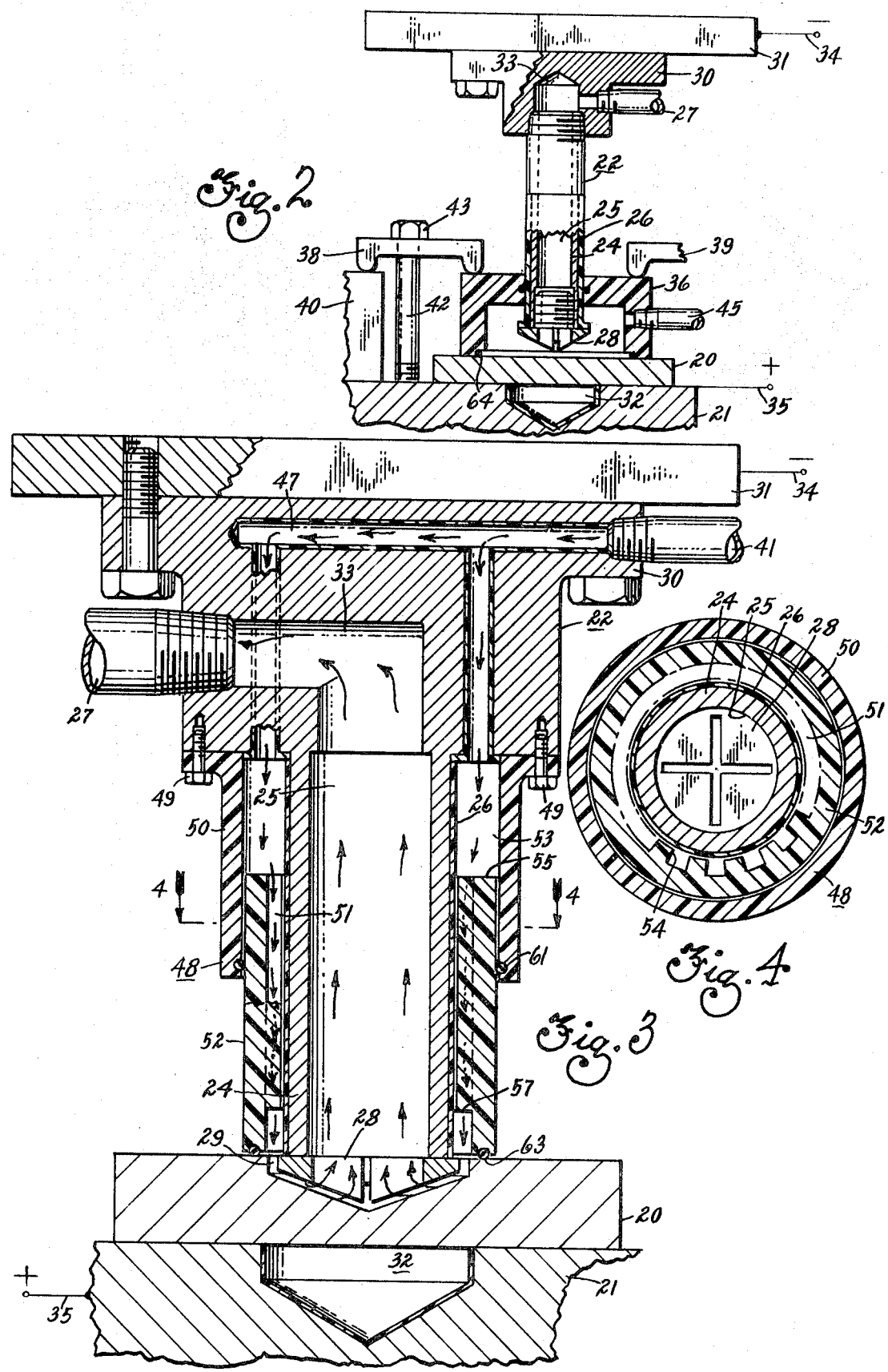

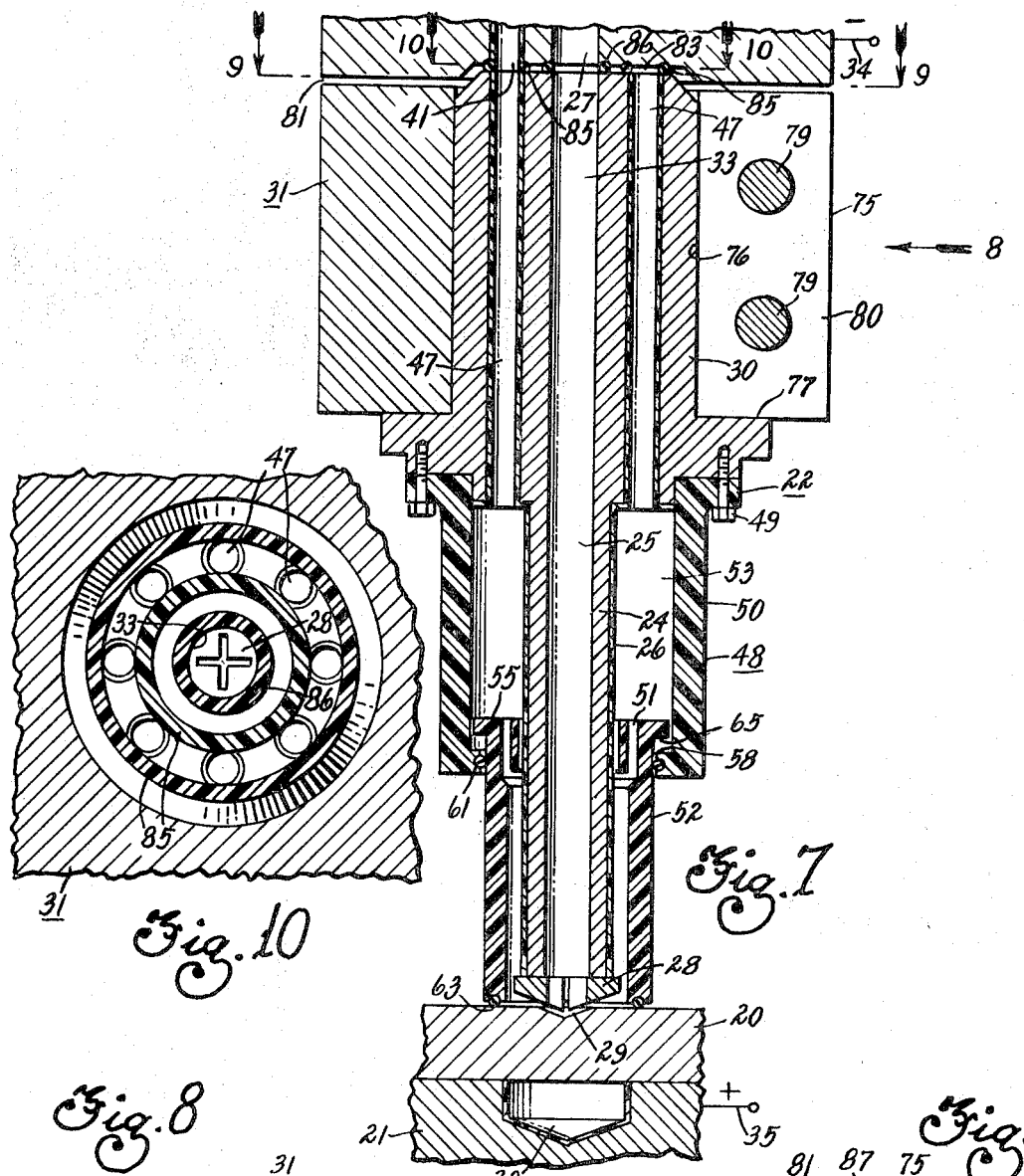

3,594,298
PORTABLE MANIFOLD FOR ELECTRO-EROSIVE MACHINES
Ronald C. Abt, Cincinnati, Ohio, assignor to Cincinnati Milacron Inc., Cincinnati, Ohio
Filed Dec. 19, 1968, Ser. No. 785,226
Int. Cl. B23p 1/04, 1/12
U.S. Cl. 204—224
8 Claims

ABSTRACT OF THE DISCLOSURE

This disclosure describes a portable manifold assembly useful in the electro-erosive machining processes. The portable manifold is a telescoping shroud supported from the cathode mounting plate and extending around the length of the tool in spaced relationship with the tool. The space between the tool and the shroud is connected to the fluid supply passage. The shroud is biased forward to contact and seal against the workpiece by the force of the fluid against the end faces of the telescoping shroud members. An O-ring seal is mounted in the end of the shroud to seal against the workpiece on contact. There is also provided a quick-change tooling system which can be used with the portable manifold of this invention.

BACKGROUND OF THE INVENTION

This invention belongs to the field of electro-erosive machines, more commonly known as electrochemical (ECM) and electrical discharge (EDM) machines.

"Reverse flow" electro-erosive machining is when the machining fluid flows from the outside of the tool, across the machining gap and out to an exhaust. This type of electro-erosive machining has been found desirable in electrochemical applications such as "slug-free" machining which is disclosed in pending application Ser. No. 463,489 now abandoned. It has also been found desirable to use "reverse flow" when good surface finishes are desired. In the past, when reverse flow machining was deemed necessary, there had to be a separate manifold clamped to the workpiece and sealed against the tool with the machining fluid supply connected thereto (as shown in FIG. 2). When it was necessary to move to a different location on a workpiece or to insert a new workpiece, it was necessary to unclamp the manifold, move the workpiece to the new location or insert the new workpiece, and realign and reclamp the manifold. Such a process was time consuming and therefore expensive. Also, due to the size of the manifold itself, the pressure inside the manifold was quite large. This required that the manifold be sturdy and therefore cumbersome. Often, obstructions on the part made the use of such a cumbersome manifold impossible or, at best, made it necessary to design a specially shaped manifold.

BRIEF SUMMARY OF THE INVENTION

In accordance with this invention, a portable manifold is provided which, in the specific embodiment shown, is supported from the mounting portion of the tool in an electrochemical machine. The manifold extends in telescoping relationship with the tool. The machining fluid flow is from the mounting portion of the tool, through a space between the manifold and the tool, across the machining gap, and out through a passage within the tool. The manifold assembly is designed such that the flow of fluid exerts a forward force on the manifold to seal it against the workpiece.

The manifold of this invention is also shown used with a set of quick-change tooling. As a result, when machining by electro-erosive methods, time is saved in two respects—that of clamping the manifold and that of mounting the tools in the machine.

It is therefore an object of this invention to provide a portable manifold assembly for use in the electro-erosive machining processes which allows rapid positioning of the tool to a location on the workpiece in a "reverse flow" machining operation.

Other objects and advantages of the present invention should be readily apparent by reference to the following specification, considered in conjunction with the accompanying drawings forming a part thereof, and it is to be understood that modifications may be made in the exact structural details there shown and described, within the scope of the appended claims, without departing from or exceeding the spirit of the invention.

BRIEF DESCRIPTION OF THE DRAWINGS

FIG. 2 is a sectional view of prior art manifolds.

FIG. 3 is a sectional view of the manifold assembly of this invention.

FIG. 4 is a sectional view along line 4—4 of FIG. 3.

FIG. 7 is a sectional view of a quick-change tooling arrangement used in combination with the manifold.

FIG. 8 is a partial view of the apparatus of FIG. 7 looking in a direction indicated by 8 in FIG. 7.

FIG. 9 is a sectional view along line 9—9 of FIG. 7.

FIG. 10 is an enlarged partial section along line 10—10 of FIG. 7.

DESCRIPTION OF PRIOR ART AND PREFERRED EMBODIMENTS

Figure 1:
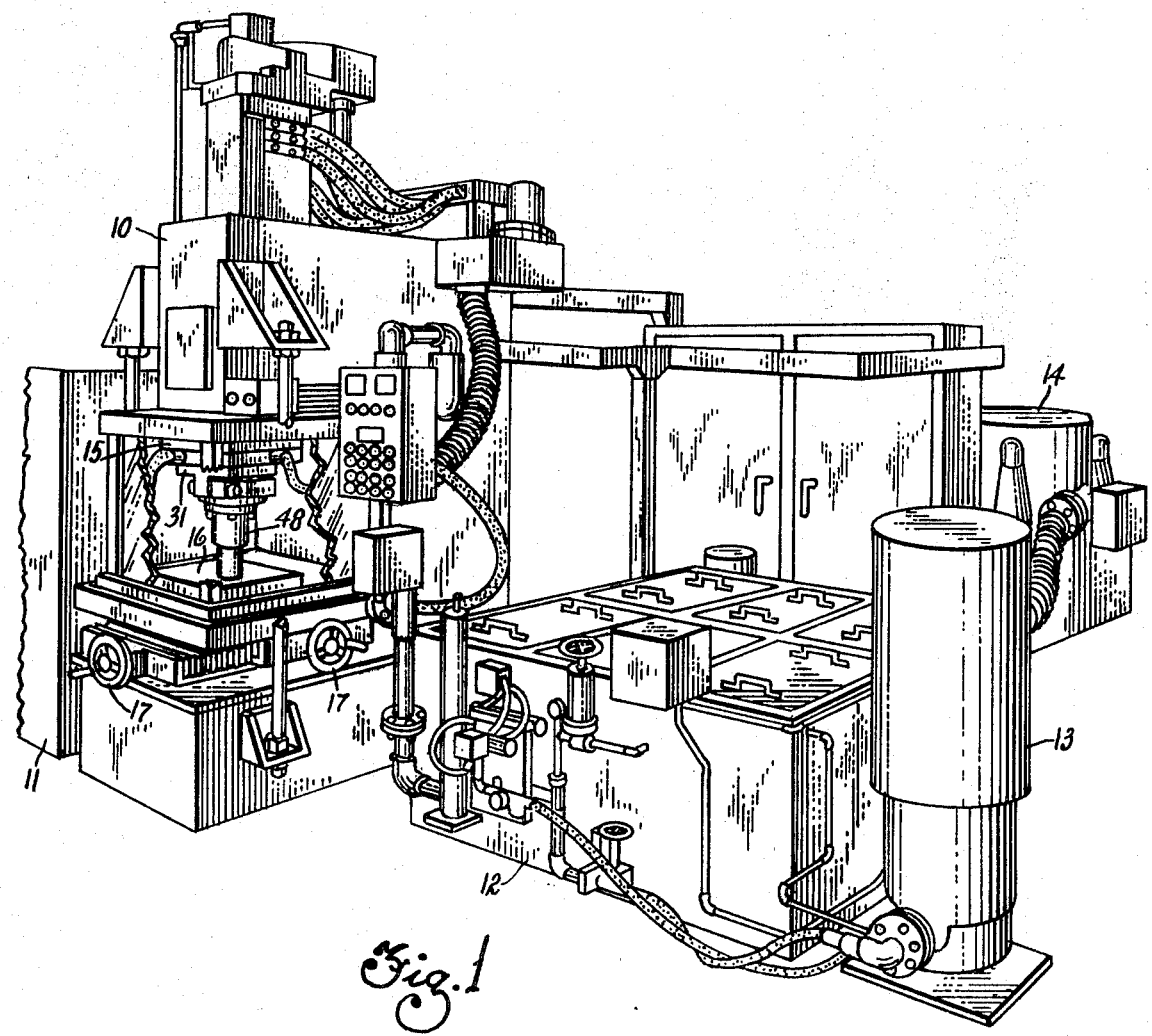
FIG. 1 is a perspective of an electrochemical machine with which the apparatus of this invention is useful.

Referring generally to FIG. 1, there is shown an electro-erosive machine. The machine has a frame 10, power supply 11, tank 12, pump 13, and centrifuge 14. The frame 10 has a head 15 movable toward and away from a table 16. The head 15 is adapted for mounting a tool thereon. The table 16 is adapted for mounting a workpiece thereon and is positionable by the handwheels 17 for machining cavities in different locations in a workpiece. Certain chambers in the tank 12 contain clean machining fluid which is pumped by the pump 13 to a machining gap between a tool and workpiece. After the machining fluid has done its work, it exhausts to other chambers in the tank 12 designated for that purpose. The used machining fluid is then centrifuged by the centrifuge 14 and returned to the chambers of the tank 12 used for clean fluid. This process is continuous to provide a continuous flow of machining fluid to the machining gap.

Referring generally to FIGS. 2–10, there is shown a device for electro-erosively machining a hole through a workpiece 20 which is supported on a platen 21 which is in turn supported on the machine table 16. In the specific embodiments shown and described, the invention is used in an electrochemical machining (ECM) operation. However, it is also useful in electrical discharge machining (EDM). A tool platen 31 is provided which is attached to the machine head 15. A tool 22 is also provided which includes a mounting portion 30 which, in turn, is attached to the tool platen 31. Thus, the tool 22 is carried by the head 15 and is movable toward and away from the workpiece. The tool 22 is comprised of a conductive shank portion 24 with a longitudinal passage 25 therethrough. The tool 22 is provided with an insulation layer 26 over the tool shank 24. It also has a conductive tip 28 that is secured in the forward end of the shank 24 which with the workpiece 20, defines a machining gap 29 over which the machining process occurs. The mounting portion 30 of the tool 22 is provided with a fluid exhaust passage 33 that communicates with the passage 25 to allow the machining fluid to exhaust from the machining gap 29 to establish reverse flow of the fluid as heretofore described. The fluid escapes to the tank 12 for cleaning (as previously described) through a fluid outlet 27. The platen 31 is electrically isolated from the work platen 21 in the conventional manner since a source of negative direct current is connected to the platen 31 so that it and the conductive portions of the tool 22 are cathodic with respect to the workpiece 20 and work platen 21 to which a source of positive direct current is connected to make them anodic. These electrical connections are represented by the leads 34 and 35, respectively. An insulated pocket 32 is provided in the platen 21 to allow breakthrough of the tool tip 28.

Referring more specifically to the prior art device of FIG. 2, there is shown a manifold 36 placed directly on the workpiece 20 and forced down there against by a pair of clamping bars 38 and 39. The bars 38 and 39 are each supported at one end on a block 40 and at their other end directly by the manifold 36. A hold-down bolt 42 secured at one end in the platen 21 extends loosely through each bar 38 and 39 and a nut 43 is threaded over the other end and turned firmly down against the respective bars 38 and 39. This provides the forceful clamping of the manifold 36 on the workpiece 20 and applies the pressure which holds the workpiece 20 in place on the platen 21. An O-ring seal 64 is provided between the workpiece 20 and the manifold 36 to effect a fluid tight seal therebetween. The manifold 36 is also provided with an inlet pipe 45 through which machining fluid under pressure is supplied to the space within the manifold 36.

Thus, in prior art manifolds of the type shown in FIG. 2, it is necessary to accurately align the manifold 36 with the tool 22 prior to the machining operation. When changing positions of the workpiece 20, it is necessary to unclamp the manifold 36, realign the workpiece 20 in the new position, realign the manifold 36 with the tool 22, reclamp the manifold 36, and proceed with the machining operation.

Figure 5:
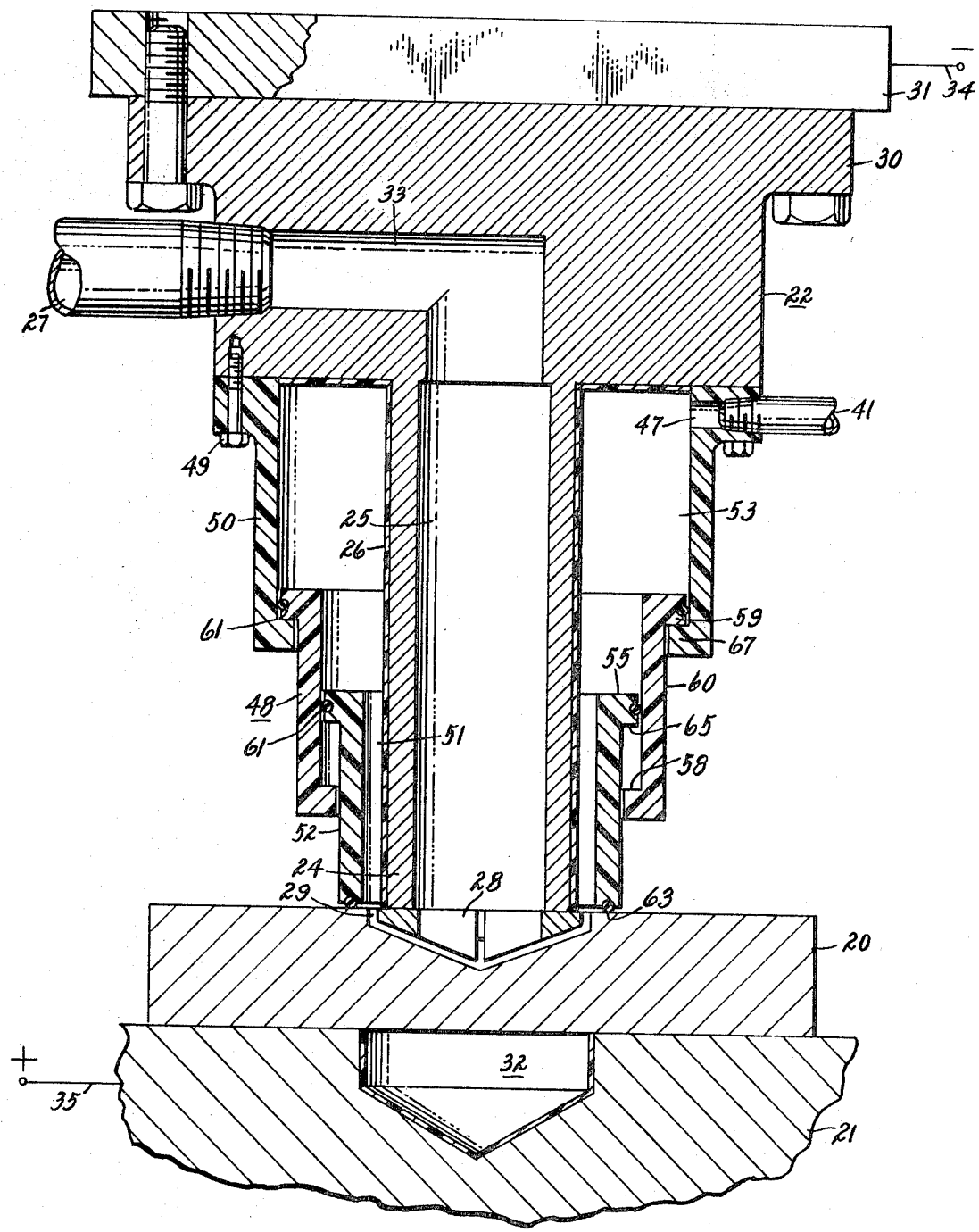
FIG. 5 is a sectional view of a second embodiment of the manifold assembly of this invention.
Figure 6:
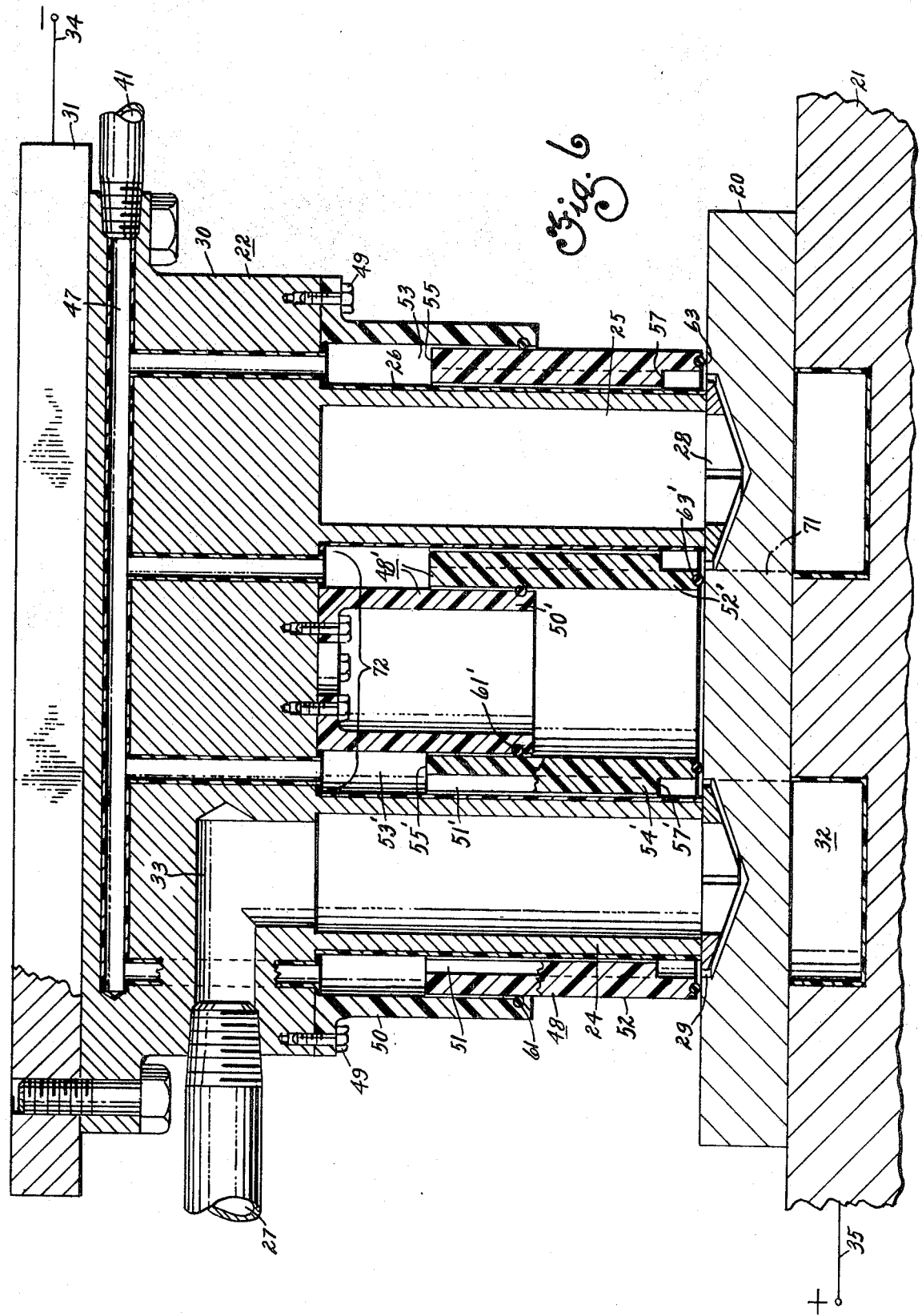
FIG. 6 is a sectional view of a manifold assembly of this invention for use in a trepanning type of cut.

Referring to FIGS. 3-10 showing the preferred embodiments of the invention, in addition to the fluid exhaust passage 33 in the tool 22, there is shown a conduit 47 in said tool 22. In FIG. 5 the conduit 47 is in an upper shroud member 50. Said conduit 47 is in communication with the pump 13 by means of the inlet 41. The manifold of this invention is a telescoping shroud 48 which is supported around and extends forward from the mounting portion 30 of the tool 22. The shroud 48 is made of an insulating material such as that known by the trademark Formica FF-91. The shroud 48 has an upper member 50 sealingly attached to the mounting portion 30 of the tool 22 by a conventional means such as the bolts 49. The upper member 50 surrounds and is in spaced relationship with the tool 22 to generally define a space 53 therebetween. A lower shroud member 52 also surrounds the tool 22 and is telescopingly received within the space 53 generally between the tool and the upper member 50. The lower member 52 has a longitudinal passage 51 therethrough which is in communication with the space 53. If it is necessary for the lower member 52 to guide on the tool 22, the passage 51 may be provided by a number of splines 54 as shown best in FIG. 4. An upper end area 55 (as viewed in FIGS. 3, 5, 6, 7) of the lower member 52 is exposed to the flowing pressurized machining fluid which provides a yieldable means for producing a forward biased force on the lower member 52 tending to extend said lower member 52 into firm engagement with the workpiece 20. A means for limiting the forward extension of the lower member 52 is provided to prevent disassembly of the manifold assembly when the tool 22 is disengaged from the workpiece 20. This means is shown in FIGS. 3 and 6 as a step 57 which catches on the tool tip 28. In FIGS. 5 and 7 this means is shown as a step 65 on the lower shroud member 52 which catches on a step 58 on an intermediate shroud member 60 (FIG. 5) or the upper member 50 (FIG. 7). Both types of steps have been found operationally satisfactory. To prevent leakage of fluid between the adjacent shroud members, a seal 61 such as that known by the trademark Quad-Ring is mounted between the adjacent shroud members. To assure a fluid tight seal of the lower member 52 with the workpiece 20, an O-ring seal 63 is carried in the end of the lower member 52 which seals against the workpiece 20 when the lower member 52 is in firm engagement with the workpiece 20 (as previously described).

Referring specifically to FIG. 5, there is shown a second type of shroud 48 to be used when machining deeper cavities. This second type of shroud 48 includes the intermediate shroud member 60, and could clearly include any number of intermediate members, and means for limiting the extension of said intermediate member 60. This means is a step 59 on the intermediate member 60 which catches on the step 67 on the upper member 50 just above it.

In operation, a workpiece 20 is mounted on the platen 21. The platen 31 is lowered and a voltage is applied between the lower platen 21 and the upper platen 31. Before the workpiece 20 is contacted by the tool tip 28, the fluid flow is begun. The pressure of the fluid against the area 55 extends the lower shroud member 52 forward into sealing engagement with the workpiece 20. Thus, a closed path for fluid flow is provided. That path is from the fluid inlet 41, through the conduit 47, into the space 53, through the passage 51, across the machining gap 29, through the tool passage 25, through the fluid exhaust passage 33, and out the fluid outlet 27. After machining has finished, the platen 31 is lifted carrying the tool 22 and the upper shroud member 50, the fluid flow is stopped, and the lower shroud member 52 is raised by the means provided. It is then very simple to reposition the workpiece 20 for further machining or to replace it with a new workpiece.

One application in which the apparatus of this invention is particularly useful is shown in FIG. 6. There the tool 22 is shown being used in a trepanning type of cut. In such a cut, a slug 71 is left when the machining is completed. Prior to this invention, the complete area 72 of the mounting portion 30 within the tool 22 was exposed to the high pressure fluid. This created extremely large separating forces on the machine. As a result, large diameter trepanned cuts could not be taken on machines due to the lack of strength of those machines.

By providing an internal manifold, the separating forces are greatly reduced due to the reduced area exposed to the high pressure machining fluid. As shown in FIG. 6, in addition to the shroud 48, an internal shroud 48' is supported from the mounting plate 30. The internal shroud 48' is also made from the insulating material known by the trademark Formica FF-91. The internal shroud 48' has an internal upper member 50' attached to the mounting plate 30 by a known means such as the bolts 49. The internal upper member 50' extends around the inside and is in spaced relationship with the tool 22 to define a space 53' therebetween. An internal lower member 52' also extends around the inside of the tool 22 and is telescopingly received in the space 53'. The internal lower member 52' has a passage 51' therethrough in communication with the space 53'. If it is desirable to allow the internal lower member 52' to guide on the tool 22 as well as the internal upper member 50', the passage 51' can be provided by a number of splines 54'. The area 55' of the upper end (as viewed in FIG. 6) of the internal lower member 52' is exposed to the flowing pressurized machining fluid which provides a yieldable means for producing a forward biased force on the internal lower member 52' tending to extend said internal lower member 52' into firm engagement with the workpiece 20. A means for limiting the forward extension of the internal lower member 52' is provided to prevent disassembly of the internal manifold assembly when the tool 22 is disengaged from the workpiece 20. This means is shown in FIG. 6 as a step 57' which catches on the tool tip 28.

To prevent leakage of fluid between the internal upper member 50' and the internal lower member 52', a seal 61' of the type known by the trademark Quad-Ring is mounted in the internal upper member 50'. To assure a fluid tight seal of the internal lower member 52' with the workpiece 20, an O-ring seal 63' is carried in the end of the internal lower member 52' which seals against the workpiece 20 when the internal lower member 52' is in firm engagement with the workpiece 20 (as previously described).

Operationally, two paths for fluid flow are provided. One path is from the fluid inlet 41, through the conduit 47, the space 53, the passage 51, the machining gap 29, the tool passage 25 and out the fluid outlet 27. The second path is from the fluid inlet 41, through the conduit 47, the space 53', the passage 51', the machining gap 29, the tool passage 25 and out the fluid outlet 27. In other respects, the internal shroud 48' operates just as previously described for the shroud 48.

Thus, there is shown a portable manifold assembly which eliminates the need to realign and reclamp the manifold when changing locations on a workpiece. Clearly, such an assembly now makes it feasible to put automatic controls on the table for machining multiple cavities in a single workpiece.

The next step is to provide tooling which would allow quick interchange and which would then make it efficient to sink cavities of different shapes and sizes in the workpiece. Such a system is shown in FIGS. 7-10 in which the platen 31 is adapted for a quick interchange of the tool 22. The platen 31 is again carried by the head 15 of the machine. However, in this embodiment the fluid inlet 41 and the fluid outlet 27 are contained in the platen 31. The platen 31 has a clamp portion or chuck 75 with a cavity 76 therein to receive the mounting portion 30 of the tool 22 to an inserted position (as shown in FIG. 7). Although the cavity 76 is shown as circular, when machining electro-erosively, the tool usually does not rotate. Thus, cavities of irregular shape can easily be machined. When machining such cavities, it is necessary to orient the tool 22 with respect to the workpiece 20. This can easily be done by providing a key (not shown) in the cavity 76 or by machining the cavity 76 in a shape which is other than circular.

The tool 22 is provided with a shoulder 77 which provides positive location of the tool 22 at the inserted position. Nut and bolt arrangements 79 are provided for clamping the tool 22 to hold it at the inserted position. The clamp portion 75 is made by cutting a slot 80 in the platen 31. The plane of the slot 80 is parallel with the direction of insertion of the mounting portion 30. A second slot 81 is cut in the platen 31. The plane of the second slot 81 is perpendicular to the direction of insertion of the mounting portion 30 of the tool 22. The slots 80 and 81 define an arm 87 which will be clamped on the mounting portion 30 of the tool 22 to hold it at the inserted position. The bolt and nut arrangements 79 are then inserted in the clamp and tightened with a thin spacer (not shown) in the slot 80. The cavity 76 is then machined to the dimensions of the mounting portion 30 of the tool 22. Thus, in operation the clamp arm 87 is biased outwardly to automatically release the tool 22 when the bolt and nut arrangements 79 are released.

An annular groove 83 is cut in the cavity 76. The annular groove 83 is in direct communication with the inlet 41 in the platen 31. The conduits 47 in the tool mounting portion 30 interconnect the space 53 and the groove 83 when the tool 22 is in the inserted position. Seals 85 are provided to assure a fluid tight connection between the groove 83 and the conduits 47. This is necessary to prevent machining fluid from corroding the interface between the clamp portion 75 and the mounting portion 30 which would destroy the positive electrical contact at that interface which is essential to the machining process.

The exhaust passage 33 in the tool 22 is in direct communication with the fluid outlet 27 in the platen 31. A seal 86 is provided between the passage 33 and the outlet 27 to again assure a fluid tight connection.

In operation after machining has finished, the head 15 of the machine is lifted, the power turned off and the flow of machining fluid stopped. A means (not shown) is provided to inject a blast of air through the inlet 41 and the outlet 27 to remove the remaining fluid. A quick turn of the nut and bolt arrangements 79 releases the tool 22 and manifold 48 from the clamp 75. A different tool can then be inserted in the cavity 76 until the shoulder 77 contacts the clamp 75. The nut and bolt arrangements 79 are then tightened and machining is continued.

In summary, there has been shown a portable manifold useful in saving the time formerly required to reclamp the manifold. The portable manifold of this invention also makes it feasible to provide automatic positioning of the table. Further, there has been shown a quick-change tooling system which facilitates changing tools and will also be found useful in connection with a manual tool changing system employing an operator tool storage station having tools of different sizes ready for rapid change in the machine as is done presently with drills and other machines. Since electro-erosive machining is usually a non-rotating process, the tools can be of varying shapes as well as sizes.

The quick-change tool system hereinbefore described may also be advantageously used in connection with automatic tool changing systems. This can easily be accomplished by providing a hydraulic clamp rather than the nut and bolt arrangements 79. The apparatus needed for the automatic changing of tools is well known in the art of metal removing machines.

While the invention has been described in connection with the specific embodiments shown, it is to be understood that the present disclosure is illustrative rather than restrictive and that changes and modifications may be made without departing from the spirit of the invention or the scope of these claims which follow.

What is claimed is:

1. A quick interchange tooling system for an electro-erosive machine for machining a cavity in a workpiece, the system comprising:
    (a) a tool having a fluid conduit therein;
    (b) a platen having;
        (1) a fluid inlet therein;
        (2) a cavity therein for receiving the tool to an inserted position;
        (3) an arm extending around a portion of the cavity, said arm being biased outwardly from said cavity;
        (4) means for clamping said arm around said tool to hold said tool at the inserted position; and
        (5) means for effecting a fluid tight seal between the inlet and the conduit in said tool when said tool is at the inserted position,
            said platent and workpiece being relatively movable to define a machining gap between the tool and the workpiece during a machining operation;
    (c) a fluid outlet in communication with the machining gap;
    (d) an upper shroud member mounted around and in spaced relationship with the tool to define a space therebetween, said space being in communication with the fluid conduit;
    (e) a lower shroud member telescopingly received in said space, said lower member extending around the tool to a position normally forward of the tip of the tool, said lower member having a longitudinal passage therethrough in communication with said space; and (f) means for sealing said lower member against the workpiece during a machining operation to close a path for fluid circulation from the fluid inlet to the fluid outlet and through said conduit, said space, said conduit, said space, said passage, and the machining gap.

2. A system as claimed in claim 1 wherein said outlet is in the platen and said system further comprises:
   (a) a passage in the tool, said passage being in communication with the machining gap; and
   (b) means for effecting a fluid tight seal between the outlet and said passage in the tool when said tool is at the inserted position.

3. A quick interchange tooling system for an electro-erosive machine for machining a cavity in a workpiece, the machine having a fluid outlet, the system comprising:
   (a) a tool having a fluid conduit therein;
   (b) a platen having;
      (1) a fluid inlet therein;
      (2) a cavity therein for receiving the tool to an inserted position;
      (3) an arm extending around a portion of the cavity;
      (4) means for clamping said arm around said tool to hold said tool at the inserted position; and
      (5) means for effecting a fluid tight seal between the inlet and the conduit in the tool when the tool is at the inserted position,
         said platen and workpiece being relatively movable to define a machining gap between the tool and the workpiece during a machining operation, the machining gap being in communication with the fluid outlet;
   (c) an upper shroud member mounted around and in spaced relationship with the tool to define a space therebetween, said space being in communication with the passage in said tool;
   (d) a lower shroud member telescopingly received in said space, said lower member extending around the tool to a position normally forward of the tip of the tool, said lower member having a longitudinal passage therethrough in communication with said space, said lower member also having an upper end area exposed to said space such that fluid pressure against said area produces a forwardly biased force tending to extend said lower member into firm engagement against the workpiece;
   (e) means for sealing said lower member against the workpiece during a machining operation to close a path for fluid circulation from the fluid inlet to the fluid outlet and through said conduit, said space, said passage, and the machining gap, said means for sealing being rendered effective by firm engagement of said lower member with the workpiece; and
   (f) means for limiting the forward extension of said lower member.

4. A system as claimed in claim 3 wherein said outlet is in the platen and said system further comprises:
   (a) a passage in the tool, said passage being in communication with the machining gap; and
   (b) means for effecting a fluid tight seal between the outlet and said passage in the tool when said tool is at the inserted position.

5. An apparatus for electro-erosively machining a workpiece comprising:
   (a) a tool having a conduit therein;
   (b) a platen having;
      (1) a fluid inlet therein;
      (2) a cavity therein for receiving the tool to an inserted position;
      (3) a flexible arm extending around a portion of the cavity, said arm being biased outwardly from said cavity;
      (4) means for clamping said arm around said tool to hold said tool at the inserted position; and
      (5) means for effecting a fluid tight seal between the inlet and the conduit in the tool when the tool is at the inserted position;
   (c) a frame having a head and table, said head having said platen mounted thereon, said table having the workpiece mounted thereon, said head and table being relatively movable toward one another to define a machining gap between the tool and the workpiece during a machining operation;
   (d) a fluid outlet in communication with the machining gap;
   (e) an upper shroud member mounted around and in spaced relationship with the tool to define a space therebetween, said space being in communication with the fluid inlet;
   (f) a lower shroud member telescopingly received in said space, said lower member extending around the tool to a position normally forward of the tip of the tool, said lower member having a longitudinal passage therethrough in communication with said space;
   (g) means for sealing said lower member against the workpiece during a machining operation to close a path for fluid circulation from the fluid inlet to the fluid outlet and through said conduit, said space, said passage, and the machining gap;
   (h) means for supplying machining fluid to said inlet; and
   (i) means for creating an electrical potential between the tool and the workpiece during a machining operation.

6. An apparatus as claimed in claim 5 wherein said outlet is in the platen and said system further comprises:
   (a) a passage in the tool, said passage being in communication with the machining gap; and
   (b) means for effecting a fluid tight seal between the outlet and said passage in the tool when said tool is at the inserted position.

7. An apparatus for electro-erosively machining a workpiece comprising:
   (a) a tool having a conduit therein;
   (b) a platen having;
      (1) a fluid inlet therein;
      (2) a cavity therein for receiving the tool to an inserted position;
      (3) a flexible arm extending around a portion of the cavity, said arm being biased outwardly from said cavity;
      (4) means for clamping said arm around said tool to hold said tool at the inserted position; and
      (5) means for effecting a fluid tight seal between the inlet and the conduit in the tool when the tool is at the inserted position;
   (c) a frame having a head and table, said head having said platen mounted thereon, said table having the workpiece mounted thereon, said head and table being relatively movable toward one another to define a machining gap between the tool and the workpiece during a machining operation;
   (d) a fluid outlet in communication with the machining gap;
   (e) an upper shroud member mounted around and in spaced relationship with the tool to define a space therebetween, said space being in communication with the fluid inlet;
   (f) a lower shroud member telescopingly received in said space, said lower member extending around the tool to a position normally forward of the tip of the tool, said lower member having a longitudinal passage therethrough in communication with said space, said lower member also having an upper end area exposed to said space such that fluid pressure against said area produces a forwardly biased force tending to extend said lower member into firm engagement with the workpiece;

(g) means for sealing said lower member against the workpiece during a machining operation to close a path for fluid circulation from the fluid inlet to the fluid outlet and through said conduit, said space, said passage, and the machining gap, said means for sealing being rendered effective by the firm engagement of said lower member with the workpiece;

(h) means for limiting the forward extension of said lower member;

(i) means for supplying machining fluid to said inlet; and (j) means for creating an electrical potential across the tool and workpiece during a machining operation.

8. An apparatus as claimed in claim 7 wherein said outlet is in the platen and said system further comprises:

(a) a passage in the tool, said passage being in communication with the machining gap; and (b) means for effecting a fluid tight seal between the outlet and said passage in the tool when said tool is at the inserted position.

References Cited

UNITED STATES PATENTS

| | | | |
|---|---|---|---|
| Re. 26,531 | 3/1969 | Bender et al. | 204—224 |
| 3,314,875 | 4/1967 | Andrews | 204—224 |
| 3,409,535 | 11/1968 | Ross et al. | 204—225X |
| 3,436,331 | 4/1969 | Dietz et al. | 204—224 |
| 3,444,070 | 5/1969 | Williams | 204—224 |
| 3,472,754 | 10/1969 | Williams | 204—225X |

JOHN H. MACK, Primary Examiner

D. R. VALENTINE, Assistant Examiner

U.S. Cl. X.R.

204—225, 297